Oct. 10, 1961 D. A. STARR, JR 3,004,173

TRIGGERED PULSE GENERATOR WITH STEERING CIRCUIT TO CONTROL OPERATION OF TIMING LOOP

Filed March 11, 1959 5 Sheets-Sheet 1

INVENTOR.
DAVID A. STARR, JR.
BY
Francis A. Varallo
AGENT

Oct. 10, 1961 D. A. STARR, JR 3,004,173

TRIGGERED PULSE GENERATOR WITH STEERING CIRCUIT TO CONTROL OPERATION OF TIMING LOOP

Filed March 11, 1959 5 Sheets-Sheet 2

INVENTOR.
DAVID A. STARR, JR.
BY Francis A. Varallo
AGENT

Oct. 10, 1961 D. A. STARR, JR 3,004,173

TRIGGERED PULSE GENERATOR WITH STEERING CIRCUIT TO CONTROL OPERATION OF TIMING LOOP

Filed March 11, 1959 5 Sheets-Sheet 3

*INVENTOR.*
DAVID A. STARR, JR.
*BY*
Francis A. Varallo
AGENT

*INVENTOR.*
DAVID A. STARR, JR.
*BY*
Francis A. Varallo
AGENT

INVENTOR.
DAVID A. STARR, JR.
BY
Francis A. Varallo
AGENT

United States Patent Office 3,004,173

Patented Oct. 10, 1961

3,004,173

TRIGGERED PULSE GENERATOR WITH STEERING CIRCUIT TO CONTROL OPERATION OF TIMING LOOP

David A. Starr, Jr., Paoli, Pa., assignor to Burroughs Corporation, Detroit, Mich., a corporation of Michigan Filed Mar. 11, 1959, Ser. No. 798,789

20 Claims. (Cl. 307—88.5)

This invention relates generally to waveshape generating circuits, and more particularly to a solid state electronic circuit for generating output pulses of a specified duration in response to input trigger pulses.

Pulse forming circuits are commonplace in the electronics art, and are employed in widely diversified applications. The circuit of the instant invention provides upon command of an input trigger pulse, an output pulse of any specified duration. If desired, the output pulse may be differentiated to obtain a second peaked pulse delayed in time from the initial trigger pulse. Because of this latter function the instant circuit is sometimes referred to as a delay circuit. A variety of prior art circuits are available to perform the aforementioned operations, namely, that of pulse generation and delay. However, the instant circuit utilizes a unique configuration of solid state components in a mode of operation which achieves a high degree of precision and stability with respect to the pulse durations or delays. A further advantage of the present circuit is that the pulse duration may be varied conveniently without affecting the precision or long time thermal stability of the circuit. In addition the instant circuit is admirably suited for applications involving a high duty factor wherein the time between the termination of an output pulse and the initiation of a succeeding output pulse is extremely small.

The operation of the pulse forming circuit of the present invention may be considered with respect to two states, namely, a quiescent, or standby state, and an active, or pulse generating state. The circuit comprises both a pulse timing section having a current feedback path and a steering section. The former section controls the duration of the output pulse while the latter determines the initiation of the output pulse in response to an input trigger pulse applied thereto. Current flows in either of two paths in accordance with the state of the steering section. During the quiescent operating state the steering section prevents current from flowing in the feedback loop of the pulse timing section. Conversely, when a trigger pulse is received by the steering section, current is switched into the feedback loop and an output pulse is initiated in the pulse timing section. After a length of time, determined by the constants of the pulse timing section, the steering section opens the feedback loop and the circuit returns to its quiescent state.

It is therefore a general object of the present invention to provide an improved pulse generating circuit.

Another object of the invention is to provide a pulse forming circuit which utilizes exclusively solid state electronic components.

A further object of the present invention is to provide an electronic circuit which generates pulses of any specified duration.

A still further object of the invention is to provide a pulse forming circuit suitable for applications requiring a high duty cycle of operation.

A more specific object of the invention is to provide an electronic circuit having a mode of operation which insures the generation of output pulses of precise duration and long time thermal stability.

These and other features of the invention will hereinafter become more fully apparent from the following description of the annexed drawings, which illustrate several embodiments, and wherein.

The operation of the basic circuit of FIG. 1 will now be described in detail by considering the aforementioned states. Conventional graphical symbols have been employed to designate the emitter, collector and base electrodes of each of the transistors. It should be noted that the invention is not restricted to the use of the types of transistors depicted in FIGS. 1–4, but may employ other types in accordance with established design procedures well known to those skilled in the art. The positive and negative supply voltages for the transistors listed respectively in order of increasing absolute magnitude are: $V_1$, $V_2$, $V_3$, $V_4$ and $-V_1$, $-V_2$, $-V_3$. The plus and minus signs appearing on the voltage waveforms of FIGS. 5–7 inclusive, represent the relative polarities of various portions of the waveforms and not absolute polarities with respect to ground reference.

Figure 1:
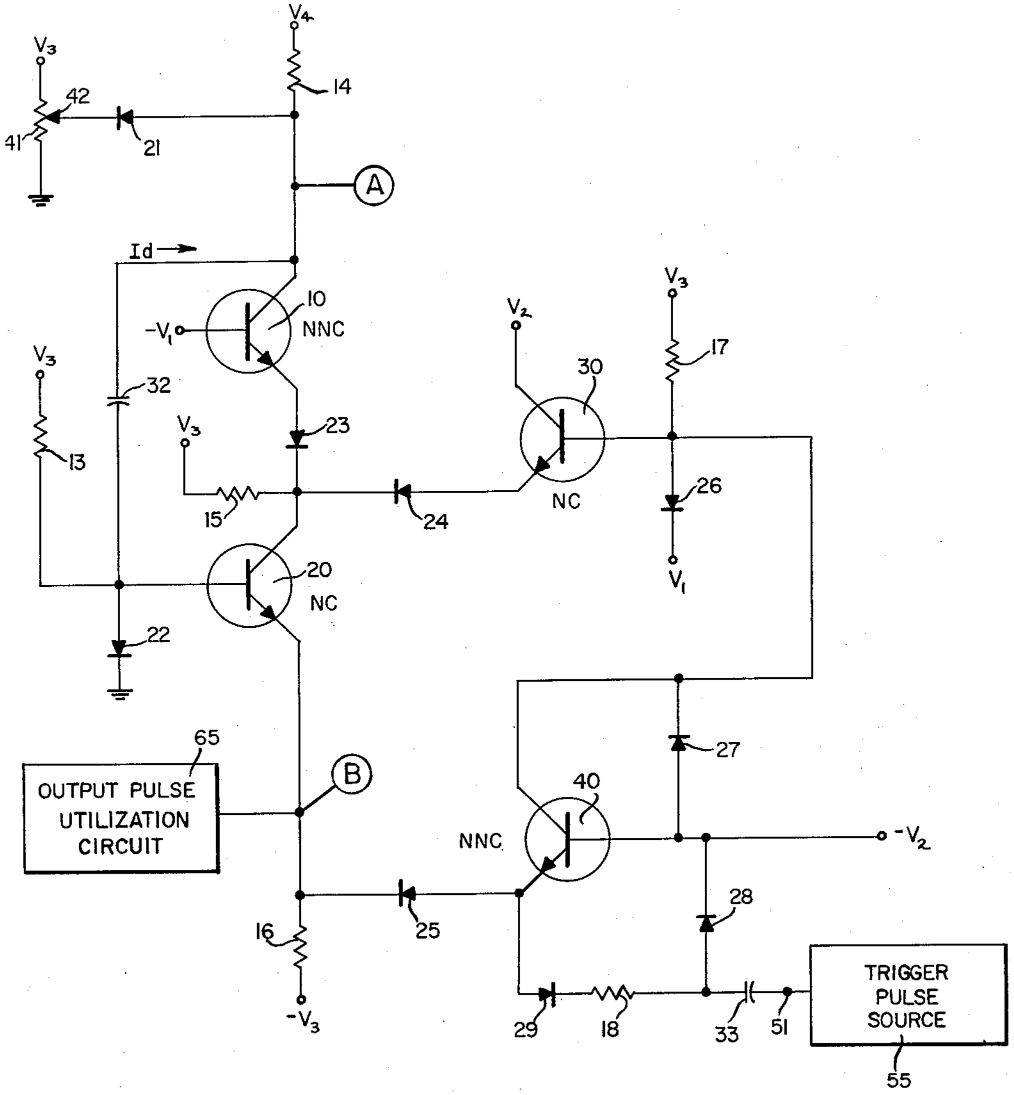
FIG. 1 is a schematic diagram depicting a basic embodiment of the instant invention.

The pulse-timing section of the instant invention, depicted in FIG. 1, comprises transistors 10 and 20, capacitor 32, first and second current means for charging capacitor 32 and a diode 23. The current steering section comprises transistors 30 and 40, diodes 24 and 25, and a source of trigger pulses 55.

During the quiescent, or standby state, transistors 10 and 40 are not conducting and transistors 20 and 30 are conducting. In FIG. 1, the designation "NC" for normally conducting has been applied to transistors 20 and 30, and "NNC," normally not conducting, to transistors 10 and 40. Transistor 30 is biased to conduction by the voltage potential existing on its base as a result of current flow from source $V_3$ through resistor 17 and diode 26 to source $V_1$. The emitter current of transistor 30 flows in the direction of the emitter arrow symbol into the collector electrode of transistor 20. It should be noted that an additional current flows from source $V_3$ through resistor 15 into the collector electrode of transistor 20. This latter current is constant throughout the circuit operation, and its purpose will hereinafter become apparent. The voltage on the collector of transistor 20, as a result of the conduction of transistor 30, reverse-biases diode 23 in the presence of the emitter voltage of transistor 10, and the latter transistor is prevented from conducting. The voltage on the base of transistor 20 consists of the voltage drop across diode 22 as a result of the current flow from source $V_3$ through resistor 13 and diode 22 to ground. The emitter current of transistor 20 flowing in the direction of the emitter arrow symbol, flows through resistor 16 and then back to ground through the internal impedance of source $-V_3$. The voltage drop across resistor 16 as a result of said emitter current flow of transistor 20 is sufficient to reverse-bias diode 25 in the presence of the voltage on the emitter electrode of transistor 40. This reverse bias opens the emitter circuit of transistor 40 and prevents the latter transistor from conducting. This manner of utilizing diode 25 to prevent the conduction of transistor 40 precludes the possibility of breakdown of transistor 40 which might result if the reverse bias were applied directly to the transistor electrodes.

During the quiescent period, capacitor 32 is charged by current flowing from source $V_4$ through resistor 14, capacitor 32 and diode 22 to ground. The magnitude of the voltage charge on capacitor 32 is determined by the setting of the sliding contact 42 of potentiometer 41. Obviously this voltage may vary between the supply voltage of $V_3$ and ground potential, and as will hereinafter become apparent, the setting of potentiometer 41 controls the duration of the output pulse. Diode 21 serves to clamp the selected voltage at the desired level. The selected voltage is designated $V_s$ and is depicted in FIG. 5*b*.

The active, or pulse forming period is initiated by the application of a negative trigger pulse from source 55 to terminal 51. The pulse depicted in FIG. 5*a* is fed to the emitter of transistor 40 via capacitor 33, resistor 18 and diode 29, and is of such polarity as to cause the emitter of transistor 40 to become negative with respect to the bias supply voltage $-V_2$. Transistor 40 conducts heavily and the emitter current flows initially into the trigger source 55. This latter current is limited in amplitude by resistor 18 so as to prevent the excessive loading of the trigger pulse source. Diode 29 prevents the turn-off of transistor 40 by the positive-going trailing edge of the trigger pulse. Diode 28 establishes a D.-C. voltage reference for the capacitor coupled trigger pulse.

The collector current of transistor 40, resulting from the application of the trigger pulse to terminal 51, flows initially from source $V_3$ through resistor 17 into the collector electrode of transistor 40. As the latter transistor tends to saturate, its collector voltage approaches its base supply potential $-V_2$ and the collector junction tends to become forward biased. This latter condition is prevented by diode 27 which clamps the collector electrode to the $-V_2$ base potential.

Thus the voltage on the collector of transistor 40 is substantially that of the base supply $-V_2$; and the base of transistor 30, which is coupled to the latter collector, also falls to the $-V_2$ level. Transistor 30 is thereby biased to nonconduction and diode 24 becomes reverse-biased by the negative potential now existing on the emitter of transistor 30. Diode 23, in the current feedback loop of the pulse-timing section which was reverse-biased by the flow of current out of the emitter of transistor 30 during the quiescent state, is now forward-biased and in condition for conduction. Thus the application of a trigger pulse to transistor 40 results in the opening of the current path in which diode 24 is situated and the closing, or establishing, of a current path through diode 23.

The abrupt cessation of current flowing into the collector electrode of transistor 20 from the emitter of transistor 30, causes a surge of current to flow through the newly established current path, i.e., from source $V_4$ through resistor 14 into the collector of transistor 10 and out of the emitter of transistor 10 through diode 23 into the collector of transistor 20. Resistor 14 is high impedance—of the order of one megohm. The aforementioned surge of current therethrough tends to produce a large voltage drop thereacross and the voltage on the collector of transistor 10 tends to drop from the value determined by the setting of potentiometer 41 to the voltage of the negative supply $-V_3$. The drop in potential at the collector of transistor 10 is coupled by capacitor 32 to the base of transistor 20. The voltage on the emitter of transistor 20 also drops through emitter-follower action until it is clamped by the forward biasing of diode 25 and the conduction of transistor 40. The resulting emitter voltage of transistor 20 has a value which is more negative than the base supply potential $-V_2$ of transistor 40 by an amount equal to the sum of the voltage drops across the base-emitter junction of transistor 40 and diode 25. This voltage level on the emitter of transistor 20, when the instant circuit is in the active state, will be referred to as $V_A$ in the ensuing operational description.

Figure 5:
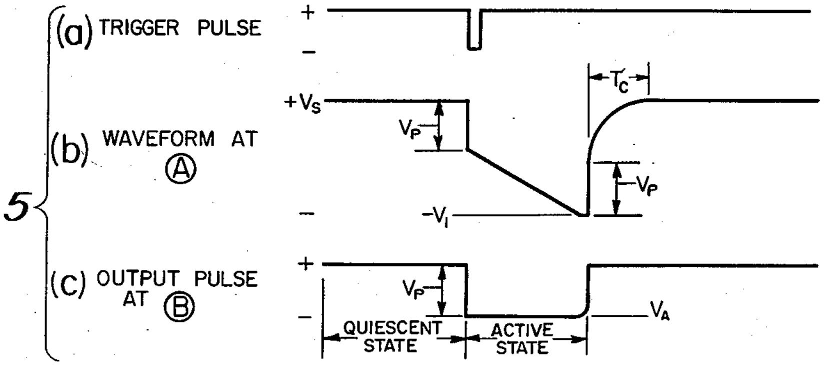
FIG. 5 (*a*, *b*, *c*) is a diagram depicting typical voltage waveforms appearing at various points in the schematic of FIG. 1.
Figure 6:
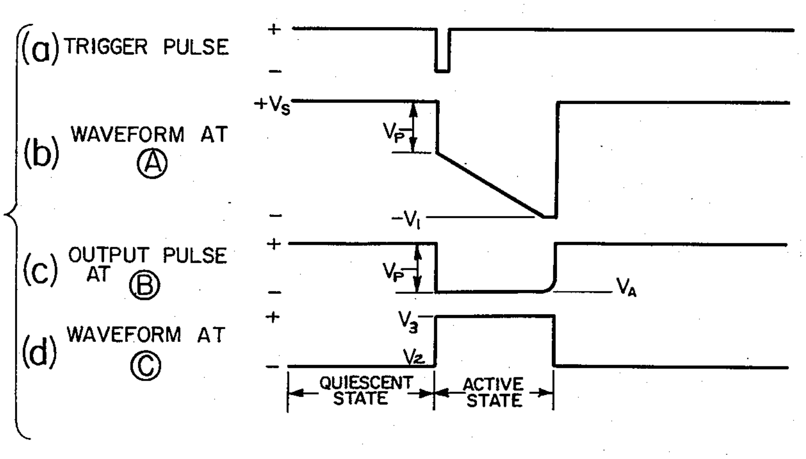
FIG. 6 (*a*, *b*, *c*, *d*) is a diagram depicting typical voltage waveforms appearing at various points in the schematic of FIG. 3.

Through the aforementioned action, the voltage on the collector of transistor 10 has also dropped sharply by an amount equal to the drop in the voltage on the emitter of transistor 20 when the circuit action is switched from the quiescent state to the active state. This change in voltage is designated $V_P$ and is illustrated in FIG. 5(*a–b*). Thus if the emitter of transistor 20 had been at zero potential during the quiescent state, and the active voltage $V_A$ is $-7$ volts, the voltage on the collector of transistor 10 will drop sharply $-7$ volts from the level, $V_s$, determined by the setting of potentiometer 41 during the quiescent state. Simultaneously, with the aforesaid drop in voltage $V_P$, the voltage on the base of transistor 20 becomes more negative so that the voltage across diode 22 is now slightly more positive than $V_A$ by the amount of the voltage drop across the emitter-base junction of transistor 20.

The voltage on the base of transistor 20 remains substantially constant throughout the active pulse-forming period due to the action of the feedback loop. If the base of transistor 20 tends to become more positive or more negative than the voltage established by $V_A$, the degree of conduction of transistor 20 will be respectively increased or decreased. An increase in current through transistor 20 causes a larger current to flow through resistor 14 with a correspondingly larger voltage drop thereacross and the base voltage again falls to the original $V_A$ level. Conversely, a decrease in current through transistor 20 causes a smaller voltage drop across resistor 14 and the potential on the base of transistor 20 rises until it is again at the original $V_A$ level.

It should be noted that the emitter current of transistor 20 during the pulse-forming period is substantially less than the emitter current during the quiescent period. Since the $\beta$ of the transistor 20 (the ratio of collector current to base current) varies as a function of small emitter currents but has a greater value and is relatively constant for larger emitter currents, the network comprising resistor 15 and source $V_3$ supplies a fixed amount of current through transistor 20. The effect of this constant current is to increase the normal emitter current during the pulse-forming period to a value which insures a relatively large $\beta$ throughout the entire circuit operation.

After the initial drop in voltage observed at the collector of transistor 10, which voltage drop represents the start of the output pulse source $V_3$ attempts to charge capacitor 32 through resistor 13 as well as to supply the small base current for transistor 20. This "charging" of capacitor 32 is balanced by the discharging thereof—the direction of current in the feedback loop being indicated by the arrow designated $I_d$. $I_d$, the current through capacitor 32, must be constant since as previously noted, any attempt to change the voltage on the base of transistor 20, such as would be the case if capacitor 32 were being charged from $V_3$ through resistor 13, would be compensated for as hereinbefore described. Since the charge "Q" on a capacitor is equal to the product of the capacitance "C" and the charge voltage "V," then:

$$\frac{dQ}{dt}=I_d=C\frac{dV}{dt}$$

and since $I_d$ is constant and C is constant, the change in voltage per unit time on the capacitor as viewed on the collector of transistor 10 is constant.

The voltage on capacitor 32 appearing at the collector of transistor 10 as depicted in FIG. 5*b* continues to decrease in a linear manner until it equals the voltage of the base supply $-V_1$ of transistor 10. At this time transistor 10 saturates and the voltage on its collector is clamped to the base supply potential $-V_1$. Since the capacitor 32 cannot discharge below the base potential of transistor 10, it ceases to discharge. The saturation of transistor 10 and the cessation of the discharge of capacitor 32 are illustrated in FIG. 5*b* by the leveled-off portion of the waveform at the $-V_1$ potential. The charge current supplied by source $V_3$ through resistor 13, is no longer balanced by the discharging of capacitor 32 and the terminal of capacitor 32, which is coupled to the base of transistor 20, begins to rise positively toward the potential of supply $V_3$. Although a rise in the base voltage of transistor 20 would, as previously explained, result in a compensating effect to keep the voltage on the base of transistor 20 constant, the saturated conduction of transistor 10 precludes the required change in current to produce said compensation. The voltage on the base of transistor 20 rises rapidly; the emitter of transistor 20, following the change in voltage. The initial charging of capacitor 32 by source $V_3$ through resistor 13 appears as the rounded corner on the trailing edge of the voltage waveform on the emitter of transistor 20—as depicted in FIG. 5*c*. Very quickly the voltage on the emitter of transistor 20 is sufficiently positive to reverse bias diode 25 thereby causing transistor 40 to cease conduction. The non-conduction of transistor 40 allows transistor 30 to conduct, which in turn results in the reverse biasing of diode 23 as previously explained; and the circuit returns to its quiescent state. It should be noted in FIG. 5 that the voltage on the collector of transistor 10 which fell sharply from $V_s$ at the initiation of the output pulse by a voltage equivalent to the magnitude of $V_P$, now rises sharply by the same $V_P$ increment at the termination of the output pulse. Capacitor 32 then begins charging to the voltage determined by the setting of potentiometer 41 viz., $V_s$, and the circuit may be triggered to initiate the next pulse-forming cycle, after the charge on capacitor 32 has reached the desired level. The time required to charge capacitor 32 to $V_s$ is designated "T*c*" in FIG. 5*b*.

Since the duration of the output pulse, or the delay time, is a function of the time required for capacitor 32 to discharge from the voltage selected by potentiometer 41 to a second predetermined value, varying the voltage $V_s$ to which capacitor 32 is charged during the quiescent state, varies the duration of the output pulse. Obviously, the higher the value of $V_s$, the longer the duration of the output pulse.

FIG. 5*c* depicts the output pulse derived from the instant circuit as taken at the emitter electrode of transistor 20. This output is fed to the utilization circuit 65. As hereinbefore mentioned, the utilization circuit may differentiate the output pulse in a conventional manner in order to obtain peaked output pulses corresponding respectively to the leading and trailing edges of the output pulse. In general, if the instant circuit is to be used as a delay means, the peaked voltage pulse corresponding to the trailing edge would be employed; the time between the input trigger pulse and said latter peaked pulse constituting the delay function. The delay provided by the instant circuit is precise, that is, it remains constant for succeeding cycles of operation, unless the setting of potentiometer is purposely changed.

Figure 2:
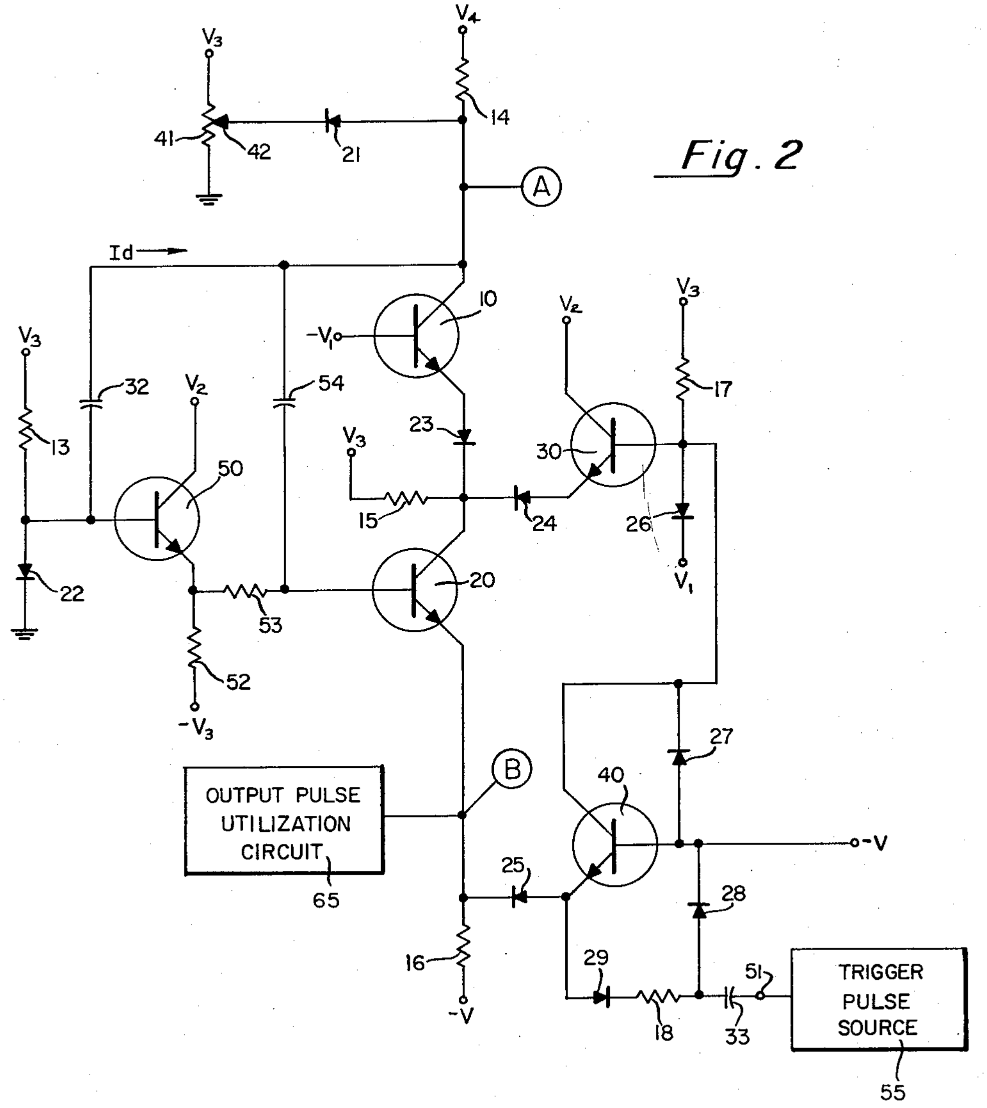
FIG. 2 is a schematic diagram depicting another embodiment of the instant invention having increased precision and stability.

The circuit of FIG. 2 is similar to that of FIG. 1 with the exception of an additional stage of amplification supplied by transistor 50 and its associated components. Like reference numerals have been employed to designate similar components in FIGS. 1 and 2. The output of transistor 50 supplies the base current for transistor 20. The base current supplied to transistor 50 by source $V_3$ and resistor 13 is smaller than that supplied to transistor 20, of FIG. 1 by factor of the $\beta$ of transistor 50. Long term thermal stability requires that the base current supplied from source $V_3$ during the pulse-forming period be as small as possible as compared with the current flowing through capacitor 32. The circuit of FIG. 2 accomplishes this design objective. The network comprising capacitor 54 and resistor 53 are employed to prevent oscillations resulting from regeneration in the feed-back loop.

In the circuit embodiment of FIGS. 1 and 2, the duty cycle of the circuit which is a function of the length of time which must elapse between the termination of one output pulse and the initiation of the succeeding output pulse is determined to a large extent by the time required to charge capacitor 32 to the voltage determined by the setting of potentiometer 41. Thus the charging time T*c* of capacitor 32 as shown in FIG. 5*b* controls the duty factor of the circuit of FIG. 1. It should be noted that the capacitor is charged by source $V_4$ through the impedance of resistor 14 which, as has been noted, is very large. Thus the amplitude of the charging current is small. In order to charge capacitor 32 more quickly and thereby decrease the time required between successive trigger pulses, the embodiment of FIG. 3 may be employed. The circuit of FIG. 3 is similar to that of FIG. 2 with the exception of transistor 60 and the circuit components and connections associated therewith.

During the active state, when transistor 30 is not conducting, the potential on the collector electrode of transistor 30 is that of the supply $V_3$. When the circuit action switches from the active to the quiescent state and transistor 30 is driven to conduction, the current drawn through resistor 35 in the collector circuit of transistor 30 causes the voltage on the collector to drop to the $V_2$ supply potential where it is clamped by diode 34. This voltage pulse appearing on the collector of transistor 30 is shown in FIG. 6*d*. If desired, this pulse which is opposite in polarity to that shown in FIG. 6*c* and appearing on the emitter electrode of transistor 20, may be used as the output pulse. It should be noted that for purposes of uniformity in the illustration of the various circuit embodiments, the output utilization circuit 65 has been depicted in FIGS. 1–4 as being connected to the emitter electrode of transistor 20. While this latter connection is suitable for many applications due to the low impedance output provided by the emitter-follower characteristic of transistor 20, it is nevertheless possible to take output pulses from other points in the circuit. For example, an output may be taken from the base of transistor 30, although an additional conventional transistor emitter-follower stage may be necessary to prevent excessive loading of the circuit.

Figure 3:
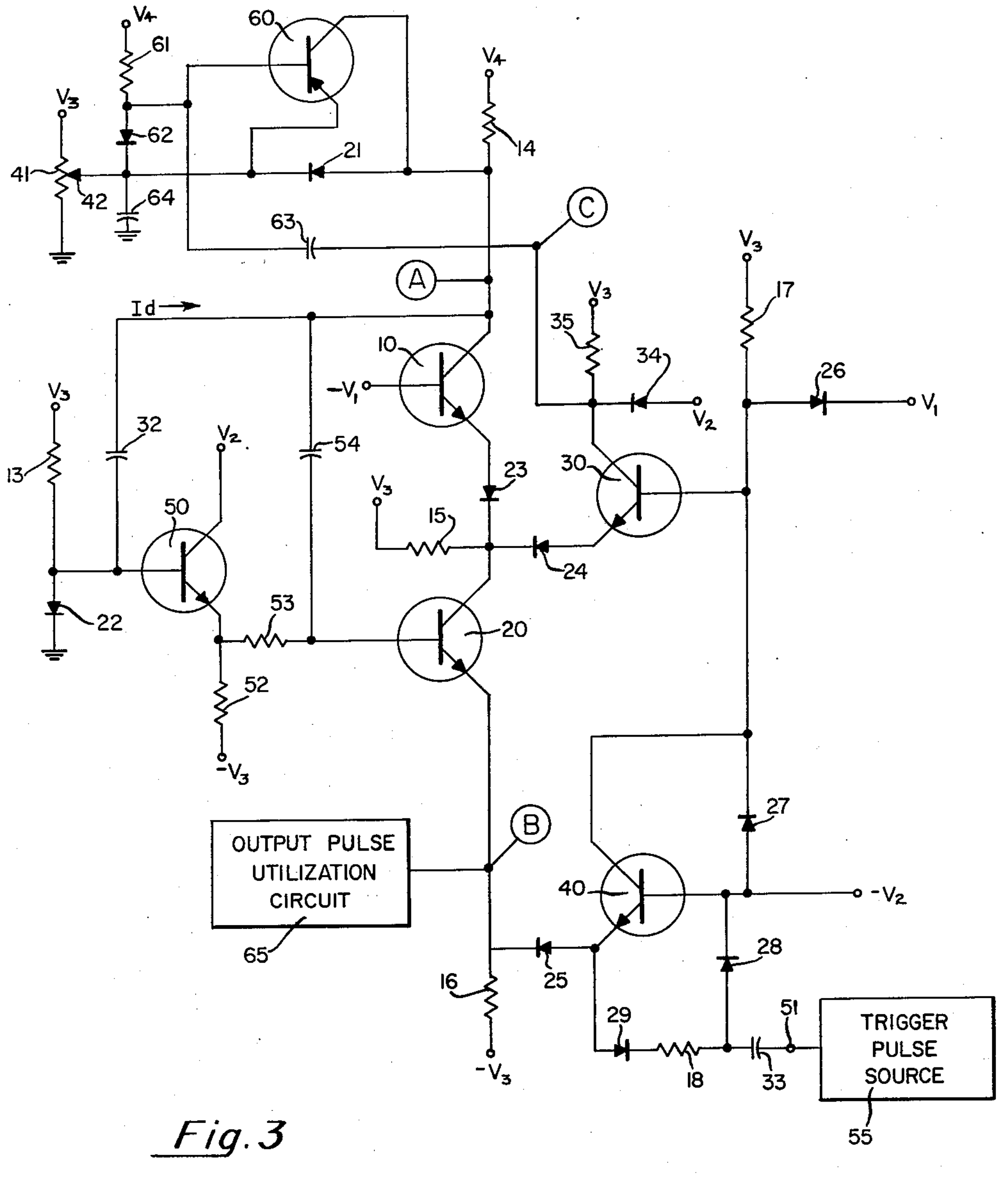
FIG. 3 is a schematic diagram of still another embodiment of the instant invention adapted for applications requiring high duty cycles of circuit operation.

Returning to the operation of FIG. 3 and the pulse developed on the collector of transistor 30, it will be noted that the negative going pulse at the termination of the pulse-forming cycle is coupled by capacitor 63 to the base of a PNP transistor 60. Transistor 60 is driven to conduction and collector current flows through capacitor 32 to ground via diode 22. The voltage $V_s$ on the emitter of transistor 60 is selected by the setting of potentiometer 41 and the collector of transistor 60 tends to assume substantially the same potential. Since capacitor 32 is charged through the low impedance of potentiometer 41 and the transistor 60, the time needed for recharging capacitor 32 to $V_s$ is negligible as shown in the waveform of FIG. 6*b*. Thus in applications requiring a high duty cycle, the circuit of FIG. 3 would be selected in preference to that of FIG. 1. Apart from the fast reset provided by transistor 60, the operation of the circuit of FIG. 3 is identical to that of FIGS. 1 and 2. Again, similar reference numerals have been used to identify like components in the various circuit embodiments. The base of transistor 60 is also connected to the intersection of resistor 61 and diode 62. The function of the latter components is to provide, in combination with supply $V_4$, a positive potential on the base of transistor 60 of sufficient amplitude to prevent the conduction thereof during the pulse-forming period. A large capacitor 64 serves to bypass current transients during the reset operation.

As hereinbefore explained, when capacitor 32 has discharged from $V_s$ to $-V_1$, transistor 10 saturates and the capacitor 32 begins to charge positively by current from source $V_3$ through resistor 13. In the case of the circuit of FIG. 1, this positive voltage is applied directly to the base of transistor 20 and the emitter of transistor follows. In the circuits of FIGS. 2 and 3, this positive voltage is applied to the base of the intermediate transistor 50, which in turn effects a positive increase in potential on the base of transistor 20. In either case, the voltage on the collector of transistor 10 during saturation is constant as shown by the level portion of the waveform at the $-V_1$ potential in FIGS. *5b* and *6b*. Likewise the charging of capacitor 32 and the application of the positive potential to the base of transistor 20 is evident in FIGS. *5c* and *6c* as the rounded trailing edge of the output pulse seen on the emitter of transistor 20.

Figure 4:
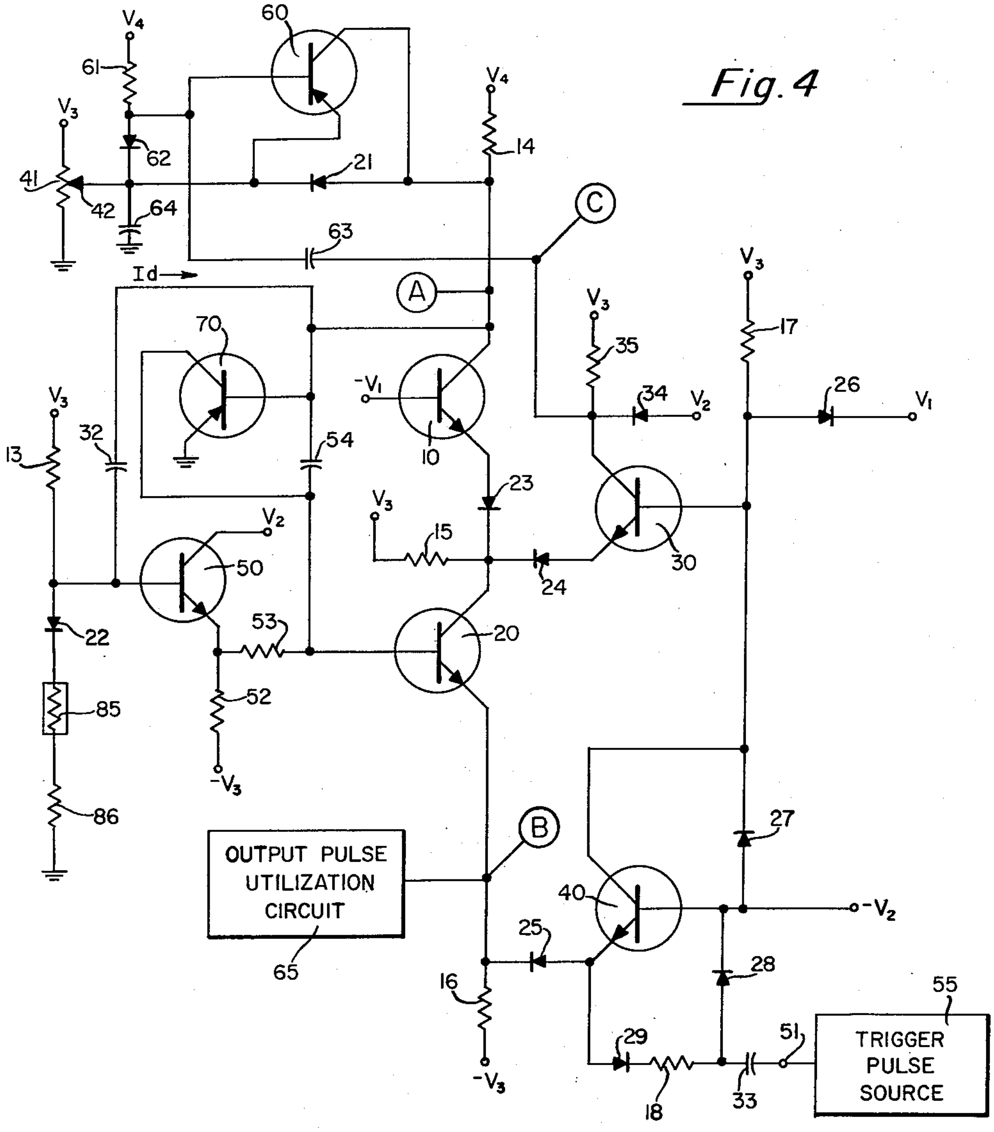
FIG. 4 is a schematic diagram of a further embodiment of the instant invention providing an improved output waveform.

Although the aforementioned transient state characteristics of the waveforms do not produce any undesirable effects on circuit operation for a majority of applications, it is possible to further improve or insure the precision of the circuit by eliminating them completely. The circuit embodiment of FIG. 4 which is substantially the same as FIG. 3 with the exception of transistor 70 eliminates said transient characteristics in the waveforms. The voltages at various points in the circuit of FIG. 4 are illustrated in FIG. 7.

It will be assumed that capacitor 32 has begun to discharge in response to the closing of the feedback path by the steering section as hereinbefore described. As the voltage on capacitor 32 decreases from the positive potential $V_s$ toward the negative potential $-V_1$ on the base of transistor 10, it must pass through zero potential or ground. However when the voltage on capacitor 32 reaches ground potential, the base of transistor 70 is also at ground. A very slight decrease in the voltage on capacitor 32, causes transistor 70 to conduct heavily. The collector of transistor 70 which is coupled to the base of transistor 20 approaches ground potential. The positive going voltage on the base of transistor 20 tends to increase the conduction of 20, which in the circuit of FIG. 4, results in a tendency for the voltage on the base of the transistor 70 to become more negative. This causes the collector of transistor 70, and the base of transistor 20 to become more closely clamped to ground potential. This regenerative cycle causes transistor 20 to saturate and the emitter potential of transistor 20 is of sufficient amplitude to reverse-bias diode 25 and halt the conduction of transistor 40. The simultaneous conduction of transistor 30, reverse-biases diode 23 and the regenerative cycle is broken by the opening of the feedback path between transistors 10 and 20. The circuit then returns to the quiescent state.

Figure 7:
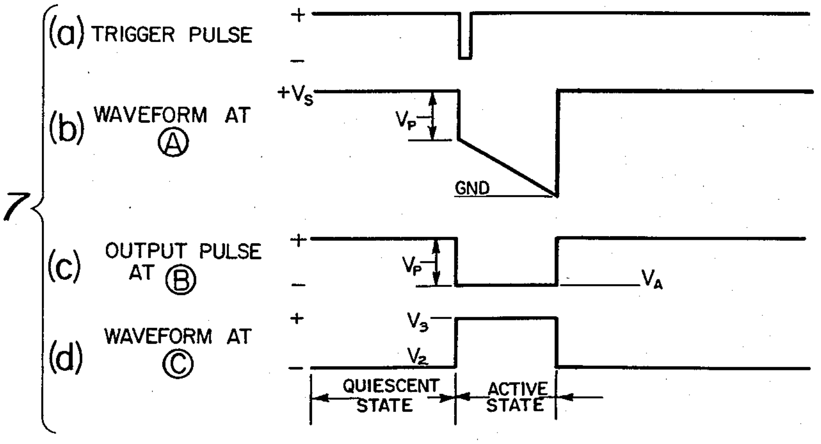
FIG. 7 (*a*, *b*, *c*, *d*) is a diagram depicting typical voltage waveforms appearing at various points in the schematic of FIG. 4.

The waveforms of FIG. 7 (*b*, *c* and *d*) show the abrupt termination of the generated pulses when capacitor 32 has discharged to approximately ground potential and the regenerative cycle involving transistors 70 and 20 has begun.

It has been mentioned that the instant circuit has good long term thermal stability. The circuit embodiment of FIG. 4 shows a practical method of further improving the stability of the circuit under varying temperature conditions. The temperature dependent element 85 and the resistor 86 control the voltage on the base of transistor 50. If, for example, silicon transistors are used in the circuit, element 85 could preferably be a silicon resistor having a positive temperature coefficient which will provide the necessary voltage change on the base of transistor 50 to compensate for the combined effects of temperature on all the circuit transistors. It should be understood that similar temperature compensation may be employed in the circuits of FIGS. 1–3.

Since other modifications varied to fit particular operating requirements will be apparent to those skilled in the art, the invention is not considered limited to the embodiments chosen for purposes of disclosure and covers all changes and modifications which do not constitute departures from the true spirit and scope of this invention. Accordingly, all such variations as are in accord with the principles discussed previously are meant to fall within the scope of the appended claims.

What is claimed is:

1. A pulse generating circuit comprising in combination, a timing section and a current steering section, said timing section comprising a plurality of current amplifying devices and a capacitive storage element arranged in a current feedback path, said capacitive element having first and second terminals, first current means coupled to said first terminal of said capacitive element for charging said element to a first predetermined potential, said steering section comprising a plurality of current amplifying devices and being coupled to said timing section, said steering section being adapted to be pulsed from a source of trigger pulses, said steering section amplifying devices determining whether or not current will flow in said feedback path of said timing section by opening said path in the absence of said trigger pulses and closing said path in response to the presence of a trigger pulse, the closing of said feedback path providing a path for discharge current to flow from said capacitive element, second current means coupled to said second terminal of said capacitive element, said second current means being responsive to the closing of said feedback path for causing a constant charging current to flow through said capacitive element, this latter current flow being in a direction opposite to the current supplied by said first current means, said capacitive element discharging at a constant rate, the voltage on said second terminal of said capacitive element and the bias voltage on a first of said timing section amplifying devices remaining constant during the discharge of said latter element as a result of the action in said feedback path, any tendency for the potential on said second terminal of said capacitive element to vary from said constant value resulting in a change of the bias voltage on said timing section first amplifying device, whereby the degree of conduction of said latter device is varied, the change in current through said feedback path restoring the voltage on said second terminal of said capacitive element and said bias voltage to constant value, means including at least one of said timing section amplifying devices for preventing the discharge of said capacitive element below a second predetermined potential and simultaneously therewith to terminate said feedback action, the cessation of said discharge allowing said second current means to charge said capacitive element, the bias voltage on said timing section first amplifying device changing in value as a result of the cessation of said discharge, said steering section responding to the change in said bias voltage by opening said feedback path, thereby halting the further charge of said capacitive element by said second current means and allowing said first current means to recharge said element to said first predetermined potential, and circuit means for deriving an output pulse from said waveshape generating circuit, said output pulse commencing with the closing of said feedback path by said steering section, having a duration equal to the time required for said capacitive element to discharge from said first predetermined potential to said second predetermined potential, and terminating with the opening of said feedback path by said steering section.

2. A waveshape generating circuit comprising in combination a pulse timing section and a current steering section, said pulse timing section comprising first and second current amplifying devices and a capacitive storage element arranged in a series feedback path, said storage element having first and second terminals, first current means coupled to said first terminal of said storage element for charging said element to a first predetermined potential, said steering section comprising a plurality of current amplifying devices and being connected to said timing section, said steering section being adapted to be pulsed from a source of trigger pulses, the state of conduction of each of said steering section amplifying devices being dependent upon the presence or absence of said trigger pulses, the state of said latter amplifying devices determining whether or not current will flow in said feedback path, said feedback path being open-circuited in the absence of said trigger pulses and closed-circuited in response to the presence of said trigger pulses, second current means coupled to said second terminal of said storage element and responsive to the closing of said feedback path for supplying charging current to said storage element, said latter current tending to charge said storage element to a potential opposite in polarity to the charge provided by said first current means, said storage element discharging at a constant rate through said feedback path, the potential on said second terminal of said storage element remaining substantially constant during the period of discharge of said storage element, any tendency for the potential on said second terminal of said storage element to vary from said constant value resulting in a change of the bias voltage on said second current amplifying device, whereby the degree of conduction of said latter device is varied, the change in current through said feedback path restoring the voltage on said second terminal of said storage element and said bias voltage to said constant value, said first current amplifying device being adapted to prevent the discharge of said storage element below a second predetermined potential and simultaneously to preclude any further changes in current through said feedback path, the termination of said discharge period resulting in a change in the potential on said second terminal of said storage element and in said bias voltage, said steering section responding to said change in bias voltage by restoring said plurality of steering section amplifying devices respectively to states of conduction existing prior to the occurrence of a trigger pulse, thereby opening said feedback path and allowing said first current means to recharge said storage element to said first predetermined potential, and output means for deriving a pulse having a duration which is a function of the time required for said storage element to discharge from said first predetermined potential to said second predetermined potential.

3. A waveshape generating circuit as defined in claim 2 wherein said current amplifying devices are junction transistors.

4. A pulse forming circuit comprising in combination a timing section and a current steering section, said timing section comprising first and second transistors and a storage capacitor arranged in a series feedback loop, said capacitor having first and second terminals, first current means coupled to said first terminal of said capacitor for charging said capacitor to a first predetermined potential, said steering section comprising third and fourth transistors, each of said transistors having an emitter, a collector, and a base electrode, said first and fourth transistors being normally non-conductive and said second and third transistors being conductive, said third transistor being coupled to said first and second transistors, the conduction of said third transistor providing a current flow into said second transistor and biasing said first transistor to non-conduction thereby effectively opening said feedback path, said fourth transistor being adapted to be pulsed from a source of trigger pulses whereby said latter transistor is driven to conduction, said third transistor being driven to non-conduction in response to the conduction of said fourth transistor thereby allowing said first transistor to conduct and close said feedback path, second current means coupled to said second terminal of said capacitor and conditioned by the closing of said feedback path for tending to charge said capacitor to a potential opposite in polarity to the charge provided by said first current means, said first and second current means jointly supplying input current for said second transistor by way of said feedback path, said capacitor discharging through said first and second transistors, the potential on said second terminal of said capacitor remaining substantially constant during the period of discharge of said capacitor, any tendency for the potential on said second terminal of said capacitor to vary from said constant value resulting in a change of the bias voltage on said second transistor whereby the degree of conduction of said latter transistor is varied, the change in current flowing in said feedback path restoring the voltage on said second terminal of said capacitor and said bias voltage to said constant value, said first transistor being adapted to prevent the discharge of said capacitor below a second predetermined potential and simultaneously to preclude any further changes in current flowing in said feedback path, the termination of said discharge period resulting in a change in the potential on said second terminal of said capacitor and in said bias voltage, said steering section responding to the change in said bias voltage by restoring said third and fourth transistors respectively to states of conduction and non-conduction, thereby opening said feedback path and allowing said first current means to recharge said capacitor to said first predetermined potential, and output means coupled to said second transistor for deriving an output pulse having a duration equal to the time required for said capacitor to discharge from said first predetermined potential to said second predetermined potential.

5. A pulse forming circuit as defined in claim 4 wherein the input current to said second transistor includes a constant component of current in addition to the current supplied by either said third transistor or jointly by said first and second current means, circuit means for supplying said constant component of current comprising a direct current source, a resistor having a pair of terminals, one of said resistor terminals being connected to said current source, the other of said resistor terminals being connected to the collector electrode of said second transistor, said constant component of current insuring that the conduction of said second transistor will be in an operating region of large and substantially constant $\beta$ regardless of the amplitude of the other currents supplied to said second transistor.

6. A waveshape generating circuit comprising in combination a pulse timing section and a current steering section, said timing section comprising first and second transistors and a capacitor arranged in a series feedback loop, each of said first and second transistors having an emitter, a collector and a base electrode, said capacitor having first and second terminals, first current means coupled to said first terminal of said capacitor for charging said capacitor to a predetermined potential, said steering section comprising third and fourth transistors, each of said latter transistors having an emitter, a collector and a base electrode, the collector electrode of said first transistor being coupled to said first terminal of said capacitor, the emitter electrode of said first transistor being coupled to the collector electrode of said second transistor, the base electrode of said first transistor being adapted to be connected to a first source of supply potential, the base electrode of said second transistor being coupled to said second terminal of said capacitor, second current means coupled to said second terminal of said capacitor and tending upon command to charge said capacitor to a potential opposite in polarity to the charge provided by said first current means, said emitter electrode of said second transistor being coupled to the emitter electrode of said fourth transistor, said emitter electrode of said fourth transistor being connected to a source of trigger pulses, the collector electrode of said fourth transistor being coupled to the base electrode of said third transistor, the base electrode of said fourth transistor being adapted to be connected to a second source of supply potential, means coupling the emitter electrode of said third transistor to the collector electrode of said second transistor, the collector electrode of said third transistor being adapted to be connected to a third source of supply potential, and output means coupled to the emitter electrode of said second transistor.

7. A pulse generating circuit as defined in claim 6 wherein said first, second, third and fourth transistors are respectively NPN junction types.

8. A pulse generating circuit comprising in combination a timing section and a current steering section, said timing section comprising first and second transistors, a first unidirectional current device and a capacitor arranged in a series feedback loop, each of said transistors having an emitter, a collector and a base electrode, said capacitor having first and second terminals, first current means coupled to said first terminal of said capacitor for charging said capacitor to a first predetermined potential, said steering section comprising third and fourth transistors, and second and third unidirectional current devices, each of said latter transistors having an emitter, a collector and a base electrode, said first and fourth transistors being normally non-conductive and said second and third transistors being conductive, the collector electrode of said first transistor being coupled to said first terminal of said capacitor, the emitter electrode of said first transistor being coupled by said first unidirectional current device to said collector electrode of said second transistor, second current means coupled to said second terminal of said capacitor for tending upon command to charge said capacitor to a potential opposite in polarity to that provided by said first current means, said base electrode of said second transistor being coupled to said second terminal of said capacitor, the emitter electrode of said second transistor being coupled by said second unidirectional current device to said emitter electrode of said fourth transistor, trigger pulse means coupled to the emitter electrode of said fourth transistor for initiating the conduction thereof, the collector electrode of said fourth transistor being connected to the base electrode of said third transistor, the base and collector electrodes of said third transistor being adapted to be connected respectively to first and second sources of supply potential, the base electrode of said fourth transistor being adapted to be connected to a third source of supply potential, said third transistor being conductive in the absence of said trigger pulses, the emitter of said third transistor being coupled by said third unidirectional current device to the collector of said second transistor, current flowing from the emitter of said third transistor into the collector of said second transistor reverse biasing said first unidirectional current device and preventing said first transistor from conducting, the conduction of said fourth transistor in response to the reception of said trigger pulse terminating the conduction of said third transistor thereby forward biasing said first undirectional current device and conditioning said first transistor for conduction, said capacitor discharging through said first and second transistors, said second current means providing a constant current flow through said capacitor, the base electrode of said first transistor being coupled to a second predetermined potential, said capacitor discharging from said first predetermined potential to said second predetermined potential, the potential on said second terminal of said capacitor and the base electrode of said second transistor remaining constant throughout the discharge period, the cessation of said discharge current allowing said second current means to charge said capacitor thereby producing a change in the potential on the base of said second transistor, said latter change in potential resulting in the reverse biasing of said second unidirectional current device and the termination of the conduction of said fourth transistor, and means coupled to the emitter electrode of said second transistor for deriving an output pulse having a duration equal to the the time for said capacitor to discharge from said first predetermined potential to said second predetermined potential.

9. A pulse generating circuit as defined in claim 8 wherein said first current means comprises a variable source of D.-C. voltage, a direct current supply, a resistive element having a pair of terminals, one of said resistive element terminals being connected to said direct current supply, and means coupling the other of said resistive element terminals to said first capacitor terminal and to said variable D.-C. voltage source.

10. A waveshape generating circuit comprising in combination a pulse timing section and a current steering section, said timing section comprising first, second and third transistors and a capacitor arranged in a series feedback loop, each of said first, second and third transistors having an emitter, a collector and a base electrode, said capacitor having first and second terminals, first current means coupled to said first terminal of said capacitor for charging said capacitor to a predetermined potential, said steering section comprising fourth and fifth transistors, each of said latter transistors having an emitter, a collector and a base electrode, the collector electrode of said first transistor being connected to said first terminal of said capacitor, the emitter electrode of said first transistor being coupled to the collector electrode of said second transistor, the base electrode of said first transistor being adapted to be connected to a first source of supply potential, the base electrode of said third transistor being connected to said second capacitor terminal, the emitter electrode of said third transistor being coupled to the base electrode of said second transistor whereby the base current of said second transistor is supplied by said third transistor, second current means coupled to said second terminal of said capacitor and adapted conditionally to provide a flow of charging current through said capacitor, said latter current tending to charge said capacitor to a potential opposite in polarity to the charge provided by said first current means, said emitter electrode of said second transistor being coupled to the emitter electrode of said fifth transistor, said emitter electrode of said fifth transistor being connected to a source of trigger pulses, said fifth transistor being normally non-conductive in the absence of said trigger pulses and being driven to conduction by said pulses, the collector electrode of said fifth transistor being coupled to the base electrode of said fourth transistor, means coupling the emitter electrode of said fourth transistor to the collector electrode of said second transistor, the respective collector electrodes of said third and fourth transistors being adapted to be connected to a second source of supply potential, the base electrode of said fifth transistor being adapted to be connected to a third source of supply potential, and output means coupled to the emitter electrode of said second transistor.

11. A pulse generating circuit comprising in combination a timing section and a current steering section, said timing section comprising first, second and third transistors, a first unidirectional current device and a capacitor arranged in a series feedback loop, each of said transistors having an emitter, a collector and a base electrode, said capacitor having first and second terminals, first current means coupled to said first terminal of said capacitor for charging said capacitor to a first predetermined potential, said steering section comprising fourth and fifth transistors and second and third unidirectional current devices, each of said latter transistors having an emitter, a collector and a base electrode, said first and fifth transistors being normally nonconductive and said second, third and fourth transistors being conductive, the collector electrode of said first transistor being coupled to said first terminal of said capacitor, the emitter electrode of said first transistor being coupled by said first unidirectional current device to said collector electrode of said second transistor, the base of said third transistor being connected to said second terminal of said capacitor, the emitter electrode of said third transistor being coupled to the base electrode of said second transistor whereby the base current of said latter transistor is supplied by said third transistor, second current means coupled to said second terminal of said capacitor and conditionally adapted to provide a flow of current through said capacitor, said latter charging current tending to charge said capacitor to a potential opposite in polarity to the charge provided by said first current means, the emitter electrode of said second transistor being coupled by said second unidirectional current device to said emitter electrode of said fifth transistor, the collector electrode of said fifth transistor being connected to the base electrode of said fourth transistor, the emitter electrode of said fourth transistor being coupled by said third unidirectional current device to the collector electrode of said second transistor, current flowing from the emitter of said fourth transistor into the collector of said second transistor reverse biasing said first unidirectional current device and preventing the conduction of said first transistor, current flowing out of the emitter electrode of said second transistor reverse biasing said second unidirectional current device whereby said fifth transistor is prevented from conducting, trigger pulse means coupled to the emitter of said fifth transistor for initiating the conduction thereof, the conduction of said fifth transistor terminating the conduction of said fourth transistor thereby forward biasing said first unidirectional current device and conditioning said first transistor for conduction, said capacitor discharging through said first and second transistors, said second current means providing a constant current flow through said capacitor, the base electrode of said first transistor being coupled to a second predetermined potential, said capacitor discharging from said first predetermined potential to said second predetermined potential, the voltage on said second capacitor terminal and the base electrodes of said second and third transistors respectively remaining constant throughout the discharge period, the cessation of the discharge period allowing said second current means to charge said capacitor thereby producing a change in the base voltage of said third transistor, said latter change in voltage being amplified by said third transistor and being applied to the base of said second transistor, the voltage on the emitter electrode of said second transistor following the change in voltage on the base of said latter transistor, said emitter voltage being of sufficient amplitude and polarity to reverse bias said second unidirectional device, thereby terminating the conduction of said fourth transistor and allowing said first current means to recharge said capacitor to said first predetermined potential, and means for deriving an output pulse having a duration equal to the time required for said capacitor to discharge from said first predetermined potential to said second predetermined potential.

12. A pulse generating circuit as defined in claim 11 wherein oscillation suppressing means are provided comprising a resistor-capacitor network, said network resistor coupling the emitter of said third transistor to the base of said second transistor and said network capacitor being connected between the collector of said first transistor and the base of said second transistor.

13. A pulse generating circuit as defined in claim 11 wherein said first current means includes a sixth reset transistor having an emitter, a collector and a base electrode, a voltage source for establishing said first predetermined potential, the emitter of said reset transistor being coupled to said voltage source, the collector electrode of said reset transistor being connected to said first capacitor terminal, the base electrode of said reset transistor being coupled to the collector electrode of said fourth transistor, means operative during the discharge of said capacitor for preventing said reset transistor from conducting, the conduction of said fourth transistor at the cessation of said discharge period initiating the conduction of said reset transistor, said capacitor being charged to said first predetermined potential by current flow therethrough supplied by said reset transistor.

14. A pulse generating circuit as defined in claim 13 wherein said timing section and said steering section transistors are respectively NPN junction varieties and said reset transistor is a PNP junction type.

15. A pulse forming circuit comprising in combination a timing section and a current steering section, said timing section comprising first, second, third and fourth transistors and a capacitor, each of said latter transistors having an emitter, a collector and a base electrode, said capacitor having first and second terminals, first current means coupled to said first terminal of said capacitor for charging said capacitor to a predetermined potential, said steering section comprising fifth and sixth transistors, each of said fifth and sixth transistors having an emitter, a collector and a base electrode, the collector electrode of said first transistor being connected to said first terminal of said capacitor, the emitter electrode of said first transistor being coupled to the collector electrode of said second transistor, the base electrode of said third transistor being connected to said second terminal of said capacitor, the emitter electrode of said third transistor being coupled to the base electrode of said second transistor whereby the base current of said second transistor is supplied by said third transistor, the collector electrode of said third transistor being adapted to be connected to a first source of supply potential, the base of said fourth transistor being connected to said first terminal of said capacitor, the collector electrode of said fourth transistor being connected to the base of said second transistor, second current means coupled to said second terminal of said capacitor and adapted conditionally to provide a flow of charging current through said capacitor, said emitter electrode of said second transistor being coupled to the emitter electrode of said sixth transistor, said emitter electrode of said sixth transistor being connected to a source of trigger pulses, said sixth transistor being normally non-conductive in the absence of said trigger pulses and being driven to conduction by said pulses, the collector electrode of said sixth transistor being coupled to the base of said fifth transistor, the base electrode of said sixth transistor being adapted to be connected to a second source of supply potential, means coupling the emitter electrode of said fifth transistor to the collector electrode of said second transistor, the collector electrode of said fifth transistor being adapted to be connected to a third source of supply potential, the conduction of said sixth transistor in response to the presence of a trigger pulse terminating the conduction of said fifth transistor and conditioning said first transistor for conduction, said capacitor discharging through said first and second transistors, the emitter electrode of said fourth transistor being coupled to a second predetermined potential, the base electrode of said first transistor being coupled to a reference potential, said second predetermined potential having a value intermediate the values of said first predetermined potential and said reference potential, said capacitor discharging from said first predetermined potential toward said reference potential, said fourth transistor being driven to conduction when the potential of said first terminal of said capacitor becomes slightly less than said second predetermined potential, the conduction of said fourth transistor preventing said capacitor from discharging to said reference potential, the collector electrode of said fourth transistor and the base electrode of said second transistor approaching said second predetermined potential, the change in potential on the base of said second transistor varying the conduction thereof, said variation in conduction resulting in a regenerative action whereby the potential on the emitter electrode of said second transistor is driven toward said second predetermined potential, said latter emitter potential being of sufficient amplitude and polarity to terminate the conduction of said sixth transistor thereby initiating the conduction of said fifth transistor and terminating said regenerative action, and means for obtaining an output pulse from said circuit.

16. A pulse generating circuit as defined in claim 15 wherein said first current means includes a seventh reset transistor having an emitter, a collector and a base electrode, a voltage source for establishing said first predetermined potential, the emitter of said reset transistor being coupled to said voltage source, the collector electrode of said reset transistor being connected to said first terminal of said capacitor, the base electrode of said reset transistor being coupled to the collector electrode of said fifth transistor, means operative during the discharge of said capacitor for preventing said reset transistor from conducting, the conduction of said fifth transistor at the cessation of said discharge period initiating the conduction of said reset transistor, said capacitor being charged to said first predetermined potential by current flow therethrough supplied by said reset transistor.

17. A pulse forming circuit as defined in claim 15 including a temperature dependent impedance element, said element being coupled to the base electrode of said third transistor and having a temperature coefficient such that a change in impedance of said element and the corresponding change in the bias potential on said third transistor compensates for the effects of temperature change on all said circuit transistors.

18. A pulse-forming circuit comprising in combination, a timing section and a current steering section, said timing section comprising a plurality of current amplifying devices and a capacitive storage element arranged in a current feedback path, said capacitive storage element having first and second terminals, first current means coupled to said first terminal of said capacitive element for charging said element to a first predetermined potential, said steering section comprising a plurality of current amplifying devices, a first of said current amplifying devices of said steering section being adapted to be pulsed from a source of trigger pulses whereby said device is driven from a first to an opposite second state of conduction, a second of said current amplifying devices of said steering section being coupled to said steering section first amplifying device and being driven thereby to a state of conduction opposite to that of said latter device, said steering section second amplifying device being coupled in common to a first and a second of said current amplifying devices of said timing section, said timing section first amplifying device being driven to a state of conduction similar to that of said steering section first amplifying device by said steering section second amplifying device, the presence of said timing section first amplifying device in said first state of conduction effectively open-circuiting said feedback path, and in said second state of conduction close-circuiting said feedback path, the close-circuiting of said feedback path providing a path for discharge current to flow from said capacitive element, second current means coupled to said second terminal of said capacitive element, said second current means being responsive to the close-circuiting of said feedback path for causing a constant charging current to flow through said capacitive element, this latter current flow being in a direction opposite to the current supplied by said first current means, said capacitive element discharging at a constant rate, the voltage on said second terminal of said capacitive element and the bias voltage on said timing section second amplifying device remaining constant during the discharge of said capacitive element as a result of the action of said feedback path, means including at least one of said timing section amplifying devices for preventing the discharge of said capacitive element below a second predetermined patential, the cessation of said discharge current allowing said second current means to charge said capacitive element, the change in the bias voltage on said timing section second amplifying device resulting from the cessation of said discharge current causing said steering section first amplifying device to return to said first state of conduction, thereby causing said steering section second amplifying device to be driven to its opposite state of conduction, said timing section first amplifying device being driven to said first state of conduction by said steering section second amplifying device and open-circuiting said feedback path, thereby halting the further change of said capacitive element by said second current means, said first current means recharging said capacitive element to said first predetermined potential, and circuit means for deriving an output pulse from said waveshape generating circuit, said output pulse commencing with the close-circuiting of said feedback path by said timing section first amplifying device, having a duration equal to the time required for said capacitive element to discharge from said first predetermined potential to said second predetermined potential, and terminating with the open-circuiting of said feedback path by said timing section first amplifying device.

19. A waveshape generating circuit comprising in combination, a pulse-timing section and a current steering section, said timing section comprising first and second current amplifying devices and a capacitive storage element arranged in a series feedback path, said storage element having first and second terminals, first current means coupled to said first terminal of said storage element for charging said element to a first predetermined potential, said steering section comprising third and fourth current amplifying devices and being connected to said timing section, said fourth amplifying device being adapted to be pulsed from a source of trigger pulses whereby said latter device is driven from a first to an opposite second state of conduction, said third amplifying device being coupled to said fourth amplifying device and assuming a state of conduction opposite to that of said latter device, said third amplifying device being coupled in common to said first and second amplifying devices of said timing section, said first amplifying device being driven to a state of conduction similar to that of said fourth amplifying device by said third amplifying device, the presence of said first amplifying device in said first state of conduction effectively open-circuiting said feedback path and in said second state of conduction close-circuiting said feedback path, the closing of said feedback path providing a path for discharge current to flow from said storage element, second current means coupled to said second terminal of said storage element and responsive to the closing of said feedback path for supplying charging current to said storage element, said latter current tending to charge said storage element to a potential opposite in polarity to the charge provided by said first current means, said storage element discharging at a constant rate through said feedback path, the potential on said second terminal of said storage element being substantially constant during the period of discharge of said storage element, any tendency for the potential on said second terminal of said storage element to vary from said constant value resulting in a change of the bias voltage on said second amplifying device, whereby the degree of conduction of said device is varied, the change in current through said feedback path restoring the voltage on said second terminal of said storage element and said bias voltage to a constant value, said first amplifying device being adapted to prevent the discharge of said storage element below a second predetermined potential and simultaneously to preclude any further changes in current through said feedback path, the termination of said discharge period resulting in a change in the potential on said second terminal of said storage element and in said bias voltage, said fourth amplifying device being driven by said change in bias voltage to said first state of conduction thereby causing said third and first amplifying devices to assume the respective states of conduction existing therein prior to the occurrence of a trigger pulse, said first amplifying device assuming said first state of conduction and opening said feedback path, thereby allowing said first current means to recharge said storage element to said first predetermined potential, and output means for deriving a pulse having a duration which is a function of the time required for said storage element to discharge from said first predetermined potential to said second predetermined potential.

20. A waveshape generating circuit as defined in claim 19 wherein said current amplifying devices are junction transistors.

References Cited in the file of this patent

UNITED STATES PATENTS

| | | |
|---|---|---|
| 2,769,907 | Lohman | Nov. 6, 1956 |
| 2,787,712 | Priebe | Apr. 2, 1957 |
| 2,838,675 | Wanlass | June 10, 1958 |